UNITED STATES PATENT OFFICE.

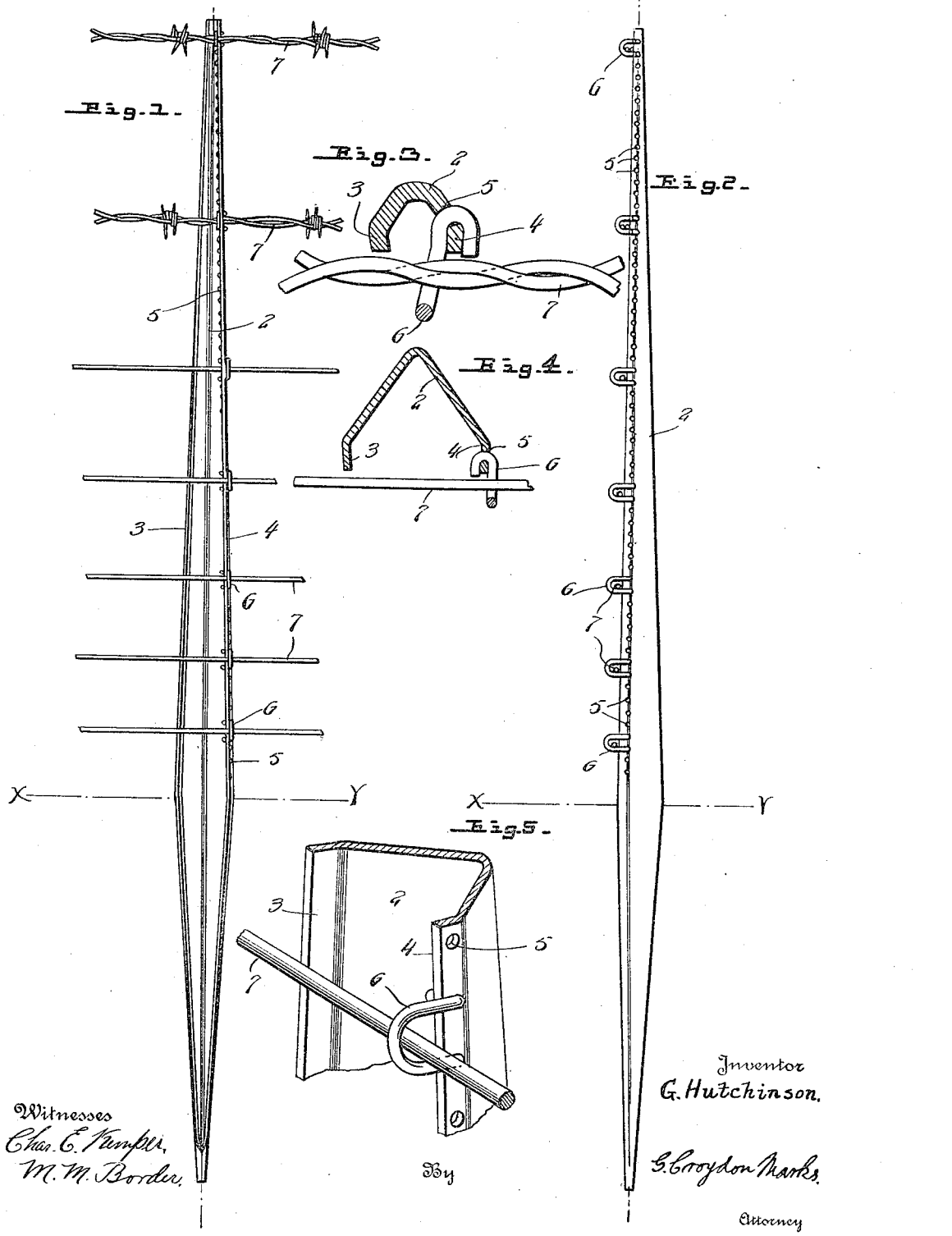

GEORGE HUTCHINSON, OF CHICAGO, ILLINOIS.

WIRE FENCE.

1,141,394.　　　　Specification of Letters Patent.　　Patented June 1, 1915.

Application filed February 10, 1915. Serial No. 7,433.

*To all whom it may concern:*

Be it known that I, GEORGE HUTCHINSON, citizen of the Dominion of New Zealand, residing at Chicago, county of Cook, State of Illinois, have invented certain new and useful Improvements in Wire Fences, of which the following is a specification.

This invention relates to wire fencing the object being to provide a structure which can be produced at a minimum expense, can be erected in a minimum of time and, when erected, is adapted to withstand the stresses to which it is subjected in the most efficient manner. In order to attain these objects I make the fencing posts of such a shape as to render them capable of withstanding the buckling stresses with the employment of a minimum amount of metal and as this involves the use of a post of open sided section I also arrange the holding means for the fence wires all upon the same edge of the post whereby the holes I employ for securing said holders are punched more readily when manufacturing the posts. The arranging of the wire holding means all on the one edge however would ordinarily have the disadvantage that pressure from the rear side of the wires would tend to rotate the posts but in order to prevent this the post, in my construction, is tapered upwardly from the ground line so that the edge flanges formed by reason of the open sided section approach the center line of the post (as viewed from the front or open side) toward the top. The reason why this attains the desired result may be more fully explained as follows:— The animals (such as sheep) which are liable to press against the lower wires are comparatively weak and therefore the larger rotating leverage or distance of the holding means from the center of the post is comparatively unimportant but the larger animals (such as horses or cows) which are liable to press against the upper wires, and particularly the top wire, are comparatively strong. The arrangement therefore, whereby the upper wires are secured near to the center line of the post, avoids strong pressure thereon from tending to rotate the post since the radius or leverage is small and at the top wire is practically nil.

Referring now to the accompanying drawings:—Figure 1 is a front view showing a post with wires and holding means arranged according to my invention; Fig. 2 is a side view of the same; Fig. 3 is a cross sectional plan the section being taken through the top holding device; Fig. 4 is a similar view the section however being taken through the bottom holding device; and Fig. 5 is a perspective view of a portion of the post.

The post 2, which is preferably stamped out of sheet metal, is made of V-shape in cross section with end flanges 3 and 4 preferably set in slightly toward one another as clearly shown in Fig. 4. As shown in Fig. 1 these flanges 3 and 4 taper upwardly toward one another from the ground line X, Y, and preferably also downwardly below the ground line. Further, the closed side of the post is cambered or tapered above and below the ground line as shown in Fig. 2, the front edges of the flanges 3 and 4 being similarly tapered viewed in this direction but to a lesser extent.

Along one of the flanges (4 as shown in the example illustrated) and near the edge thereof a series of holes 5 are punched by which the wire holding means are attached at desired heights. These holding means preferably consist of wire staples 6 looped at the front so as to freely receive the wires 7 which pass across the front of the post and they are provided with two legs which are bent round so as to pass through two consecutive holes 5. The ends of these legs are bent around tightly against the flange 4 so as to hold each staple firmly in position.

The staples may be inserted so that the loops are on either side of the flange 4 but preferably they are arranged on the outside except those near the top which, as shown in Fig. 1, are preferably inside so that they are nearer the center line of the post for the reasons above set forth.

What I claim as new and desire to secure by Letters Patent is:—

1. In combination a fence post of substantially U or like section, a plurality of fence wires passing across the open side of said post, and fasteners on one side only of the post engaging the fence wires, the fasteners being arranged in increasing distances, laterally from the center line of the post, downwardly from the top and the topmost fastener being at said center line.

2. In combination a fence post of substantially U or like section, a plurality of fence wires passing across the open side of said post, and fasteners on the post engaging the fence wires, the fasteners being arranged only along one edge of the post in increasing distances, laterally from the center line of the post, downwardly from the top and the topmost fastener being at said center line.

In testimony whereof I affix my signature in presence of two witnesses.

GEORGE HUTCHINSON.

Witnesses:
H. R. KERSLAKE,
P. H. MOORE.